April 16, 1957  R. H. LISKA  2,788,673
MECHANISM FOR IMPARTING ROTARY MOTION
TO INDEX TABLES AND THE LIKE
Filed Feb. 11, 1954  6 Sheets-Sheet 1
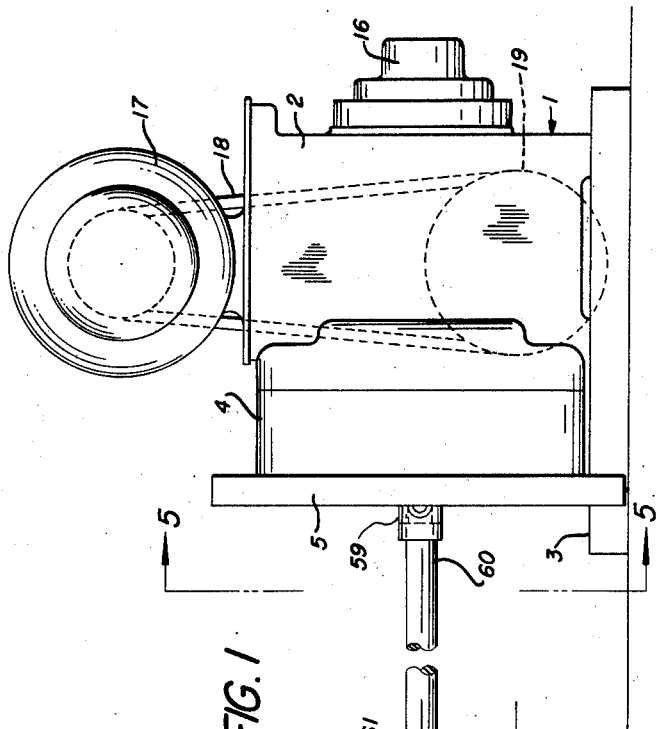
FIG. 1
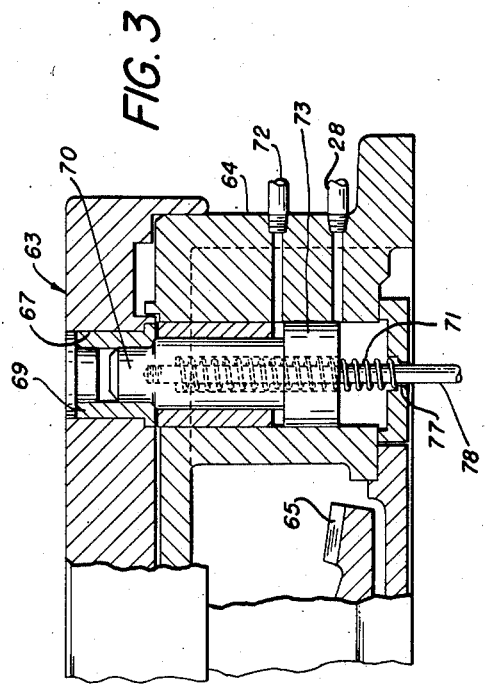
FIG. 3
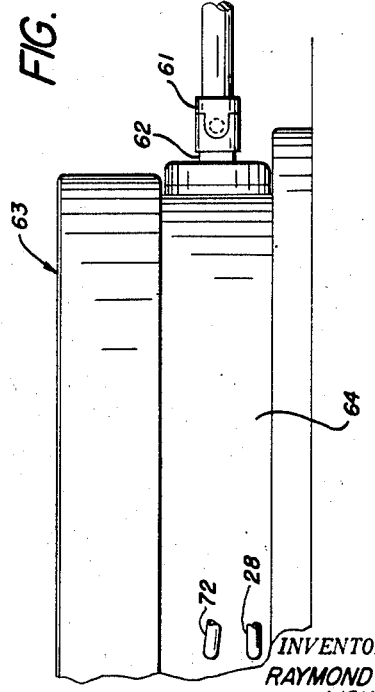
INVENTOR.
RAYMOND H. LISKA
BY
*Ish Ward Ornstein*
ATTORNEYS

INVENTOR.
RAYMOND H. LISKA
BY
ATTORNEYS

April 16, 1957 R. H. LISKA 2,788,673
MECHANISM FOR IMPARTING ROTARY MOTION
TO INDEX TABLES AND THE LIKE
Filed Feb. 11, 1954 6 Sheets-Sheet 3

FIG. 4

INVENTOR.
RAYMOND H. LISKA
BY
ATTORNEYS

April 16, 1957 R. H. LISKA 2,788,673
MECHANISM FOR IMPARTING ROTARY MOTION
TO INDEX TABLES AND THE LIKE
Filed Feb. 11, 1954 6 Sheets-Sheet 6

INVENTOR.
RAYMOND H. LISKA
BY
ATTORNEYS

United States Patent Office 2,788,673
Patented Apr. 16, 1957

2,788,673

MECHANISM FOR IMPARTING ROTARY MOTION TO INDEX TABLES AND THE LIKE

Raymond H. Liska, Cleveland, Ohio, assignor to The Cleveland Universal Jig Company, Cleveland, Ohio, a corporation of Ohio Application February 11, 1954, Serial No. 409,732

4 Claims. (Cl. 74—393)

This invention relates generally to mechanism or means for imparting rotary movement to index tables and the like, but has reference more particularly to a mechanism which will impart a movement which is not uniform or constant throughout the cycle of rotation.

In my copending application, Serial No. 396,942, I have disclosed a mechanism which imparts an intermittent rotary motion to an index table or the like, without shock, and while keeping the table under positive control throughout the cycle. Such a mechanism imparts to the index table a rotary motion or movement which progressively increases in velocity or speed from a zero velocity or speed at one station to a maximum speed or velocity at a point midway between said station and the next station, and back to zero speed or velocity at the next station.

The present application is directed to a modification of the mechanism described in my aforesaid copending application, in which mechanism certain bevel gears, bearings and other working parts, have been eliminated, thereby substantially reducing the cost of manufacture of the mechanism, without substantially altering the nature of the movement obtained.

The present invention also has as one of its objects the provision of a mechanism of the character described which consists of a minimum number of parts that can be manufactured and assembled at relatively low cost, and which does not require frequent repair or replacement of parts, but the parts of which are readily accessible for repair or replacement, if necessary.

Other objects and advantages of my invention will be apparent during the course of the following description.

In the accompanying drawings forming a part of this specification and in which like numerals are employed to designate like parts throughout the same, Fig. 1 is a side elevational view of apparatus embodying the invention;

Fig. 3 is a fragmentary cross-sectional view, taken on the line 3—3 of Fig. 2;

Fig. 4 is a cross-sectional view, on an enlarged scale, taken on the line 4—4 of Figs. 2 and 5;

Figure 2:
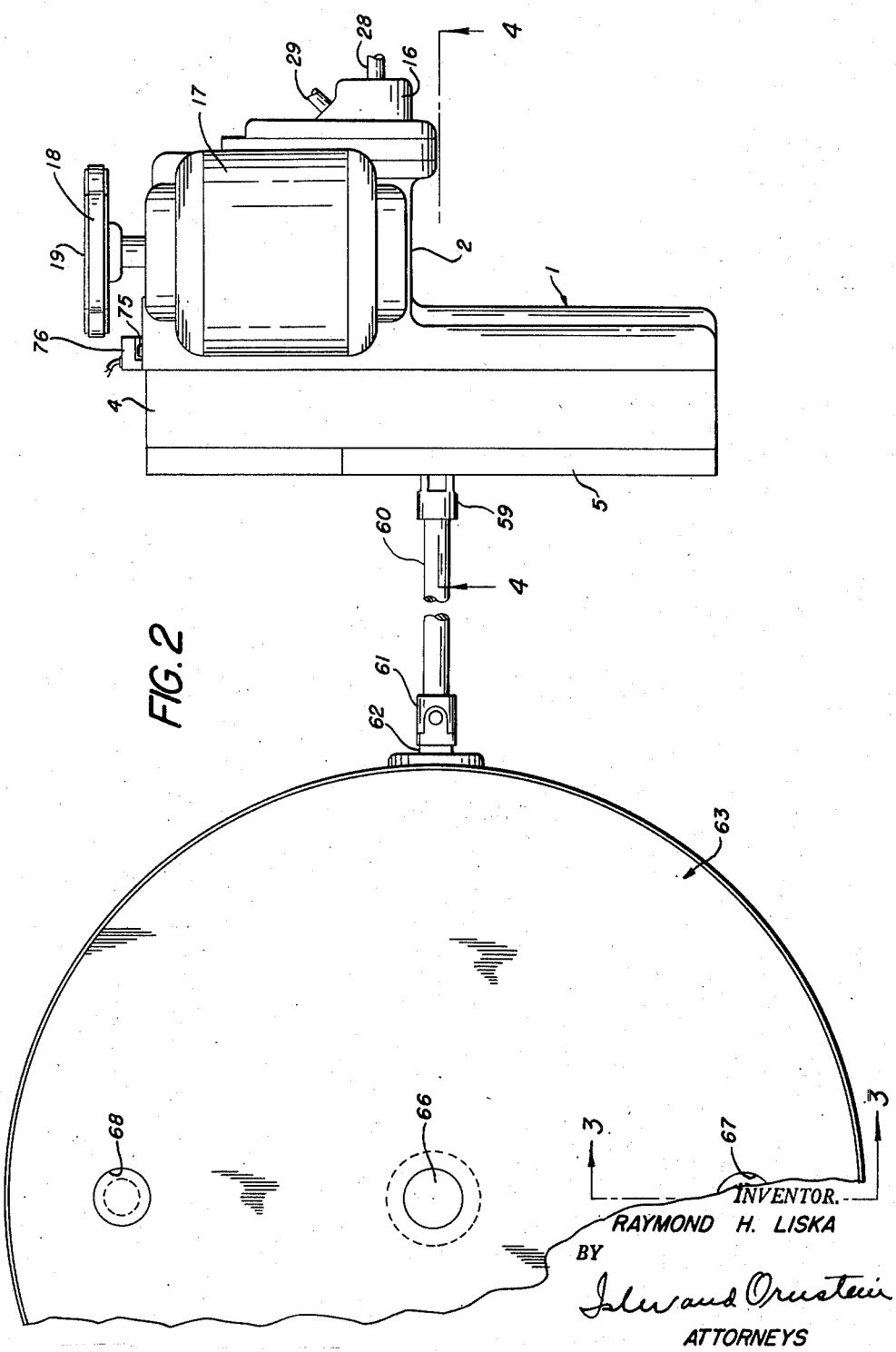
Fig. 2 is a top plan view of the apparatus of Fig. 1.

Referring more particularly to the drawings, reference numeral 1 designates generally a housing comprising a main portion 2 having a base 3, a spacer 4, and a cover plate 5, these parts being removably secured together as by means of screws 6.

Journalled for rotation in bearings 7 and 8 within the portion 2 of the housing is a shaft 9, which is adapted to be rotated by a worm wheel 10 which surrounds the shaft and has secured to one end thereof (Fig. 6) a ring gear 11 having internal teeth 12. One end of the gear 11 bears against one end of a member 13 which contains the bearing 8 and which is secured to the portion 2 of the housing by means of screws 14. Secured to the member 13, as by screws 15, is a cap or cover member 16. The worm wheel 10 is continuously driven by an electric motor 17 through the intermediary of an endless belt 18, a pulley 19, a shaft 20 and a worm 21.

Splined or keyed to the shaft 9 is a clutch member 22 provided with gear teeth 23 which are adapted to be moved into driving engagement with the ring gear 11 at such times when it is desired to drive the shaft 9. Movement of the clutch member 22 for this purpose may be effected in a number of ways, but in this instance, I use a clutch fork 24, which is clamped to a rod 25 which is mounted for reciprocal movement in the housing 2 and is provided with a piston 26 at one end which moves in a cylindrical cavity 27 of the cap 16. When the clutch member 22 is to be engaged with the ring gear 12, compressed air is admitted into the cylinder 27 through a conduit 28, causing the rod 25 to move to the left, as viewed in Fig. 6. When the clutch member 22 is to be disengaged, compressed air is admitted into the cylinder 27 through a conduit 29, causing the rod 25 to be moved to the right, as viewed in Fig. 6.

The shaft 9 is provided at its inner end with a crank arm 30, to which one end of a link or arm 31 is pivotally connected. This link or arm 31 has journalled in an opening 32 thereof a driven gear 33, which is rigidly secured to the crank arm 30 by means of screws 34. The axis of the shaft 9 intersects the pitch circle of the gear 33 and this relationship remains constant throughout the operation of the device which will be presently described.

The drive gear 33 drives an idler gear 35, which, in turn, drives a third or drive ngear 36, which is identical in size with the gear 33. The gears 33, 35 and 36 lie in the same vertical plane adjacent the link 31, and each is free to rotate relatively to the link 31.

The gear 35 is removably secured to the link 31 by means of a pin 37 and nut 38, a roller bearing (not shown) being interposed between the gear and pin to permit free rotation of the gear.

For the purpose of permitting the gear 36 to rotate freely relatively to the link 31, a pin 39, which extends axially through the gear 36, is rigidly secured to the link 31, as by means of a nut 40, and roller or pin bearings 41 and 42 are interposed between the gear 36 and pin 39.

The link 31 is T-shaped, the arms 31a and 31b of the link terminating in arcuate end surfaces 31c and 31d respectively. The surfaces 31c and 31d bear against wear plates 43, which are secured to the wall of the housing 2 by means of screws 44. The arcuate surfaces 31c and 31d permit the link 31 to have a rocking or oscillatory movement in its own plane incidental to the operation of the mechanism, as will be presently described. The link is guided in such oscillatory movement between surfaces 45 of the housing portion 2 and surfaces 46 of the spacer 4.

Secured to the gear 36, as by means of screws 47, is a coupling element 48 which is in axial alignment with the gear and is provided with a pair of spaced ears 49 and 50 which extend through an opening 51 in a slide plate 52 which is interposed between the coupling element 48 and the cover 5 of the housing. The ears 49 and 50 also extend through a somewhat elliptical or oval-shaped opening 53 in the cover 5, which opening has a beveled edge 54.

Journalled for rotation in the ears 49 and 50 is a shaft 55 having trunnions 56 extending at right angels thereto, to which the ears 57 and 58 of a second coupling member 59 are pivoted. The parts 49, 50, 55, 56, 57, 58 and 59 form a universal joint or coupling.

A shaft 60 extends from the coupling member 59, and drives an index table through a universal coupling or joint 61 and shaft 62.

The index table, designated 63, is mounted for rotation on a base 64. Rotation is effected by the shaft 62 through the intermediary of a bevel pinion (not shown), a bevel gear 65 (Fig. 3), and a shaft 66 secured to the center of the table 63; as described in copending application, Serial No. 396,942.

The table 63 is provided at circumferentially-spaced points with recesses 67 and 68, in which are mounted bushings 69, which are adapted to receive the index pin 70, for the purpose of locking the table to the base 64. The recesses 67 and 68 define stations of a two-station table, and in this case, are 180 degrees apart. It will be readily understood, however, that the table may be provided with any desired number of such recesses, defining additional stations.

The index pin may be actuated in any desired or conventional manner. In this case, the index pin is automatically moved into locking position by means of a compression coil spring 71, and is retracted by means of compressed air which enters the base 64 through a conduit 72, to exert pressure on the piston-like head 73 of the pin 70.

The driving mechanism which has been described is designed to rotate the index table between stations, but in view of the large mass which is to be thus moved, it is desirable to impart to the table a rotary motion which gradually varies from a zero velocity or speed at one station to a maximum speed or velocity at a point midway between that station and the next station, and back to zero speed or velocity at the next station. It is desirable, in other words, to produce an intermittent rotary motion which will start and stop the index table without shock and yet keep the table under positive control throughout the cycle.

Such a motion has been obtained by means of the drive mechanism shown and described in my copending application, Serial No. 396,942.

In the present case, the motion is obtained through a modification of the mechanism described in that application, with the elimination of certain parts of that mechanism which is designed to reduce costs to some extent, and utilize a more direct drive of the index table.

The gear ratios in my device are such that one complete revolution of the shaft 9 will produce a half revolution of the index table 63, which is equivalent to rotation of the table between its two stations.

The shaft 9 drives the shaft 60 through the intermediary of the crank arm 30, gear 33, gear 35, gear 36, coupling element 48 and coupling element 59.

Figure 5:
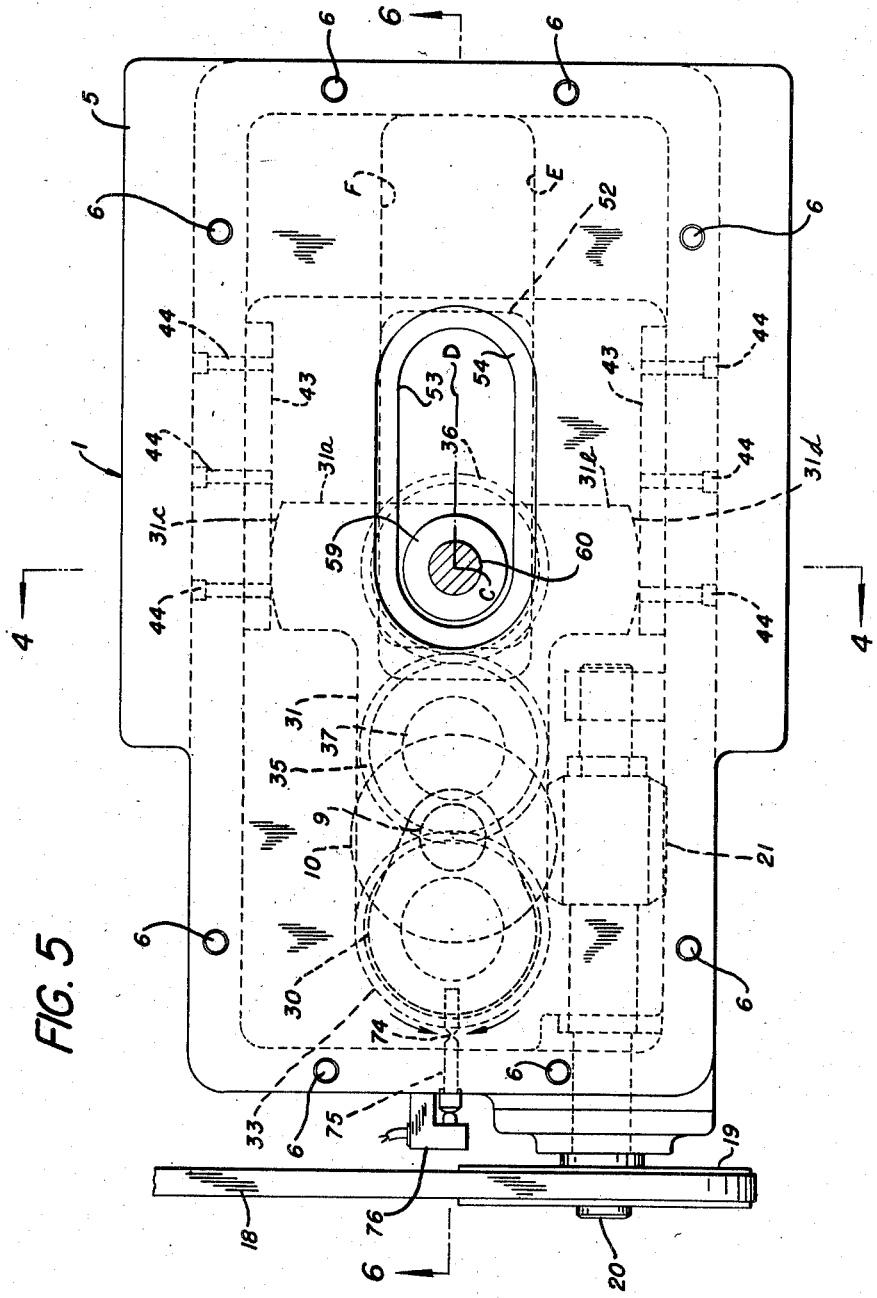
Fig. 5 is a cross-sectional view, taken on the line 5—5 of Fig. 4.
Figure 6:
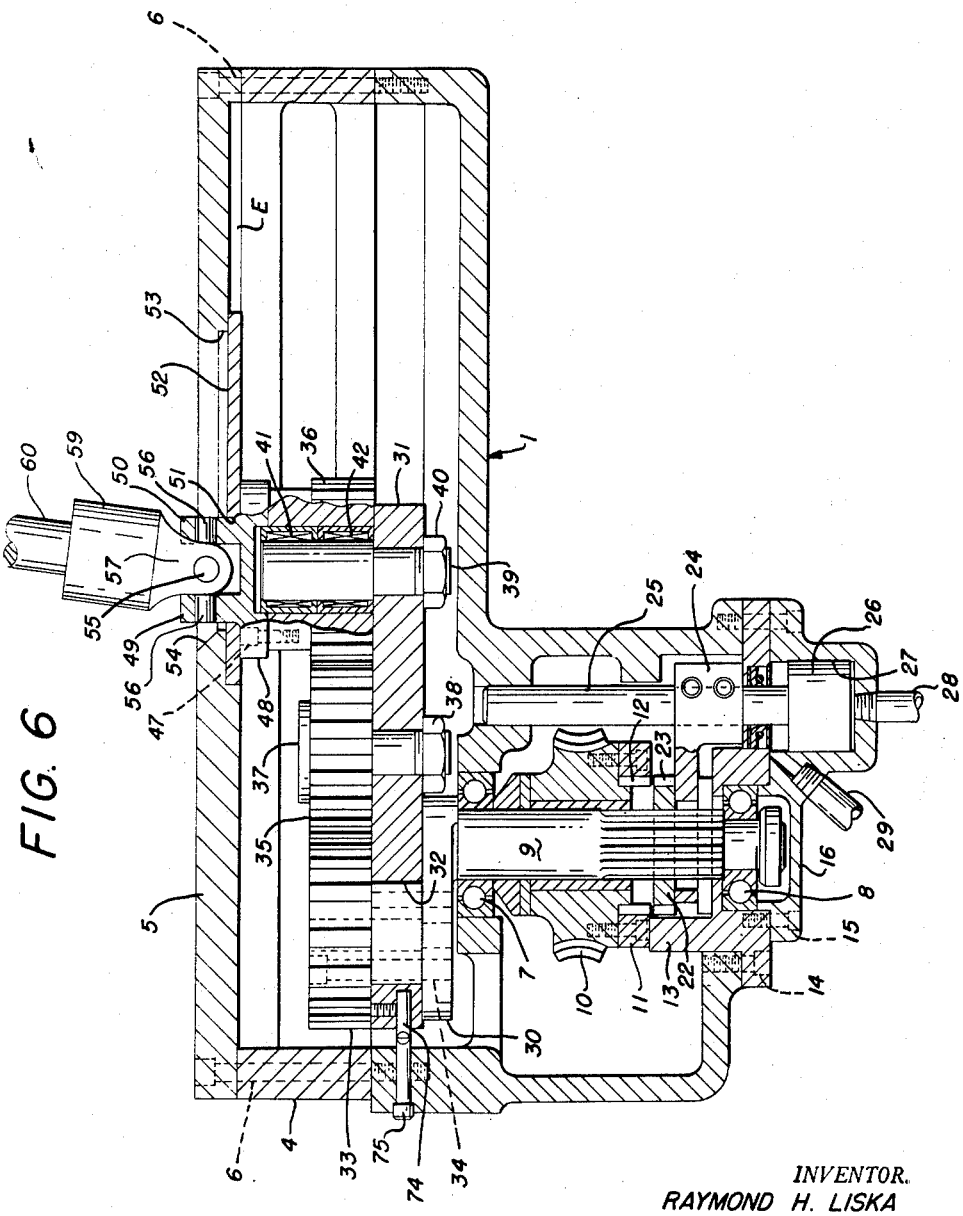
Fig. 6 is a cross-sectional view, taken on the line 6—6 of Fig. 5.
Figure 7:
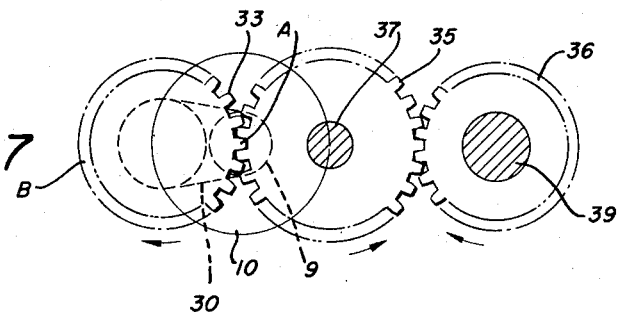
Fig. 7 is a view illustrating, more or less diagrammatically, the position of the critical parts of the driving mechanism at the beginning of a cycle of rotation of the index table, e. i., rotation from one station to the next.
Figure 8:
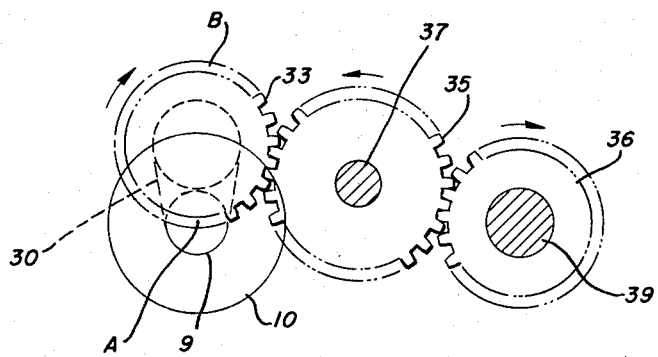
Fig. 8 is a view similar to Fig. 7, but illustrating the position of the parts after the drive shaft has rotated 90 degrees.
Figure 9:
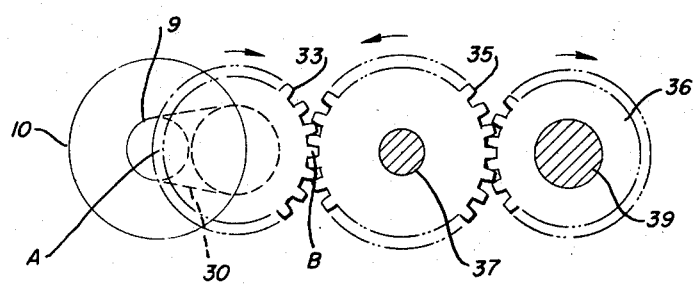
Fig. 9 is a view similar to Fig. 8, but illustrating the position of the parts after the drive shaft has rotated 180 degrees.
Figure 10:
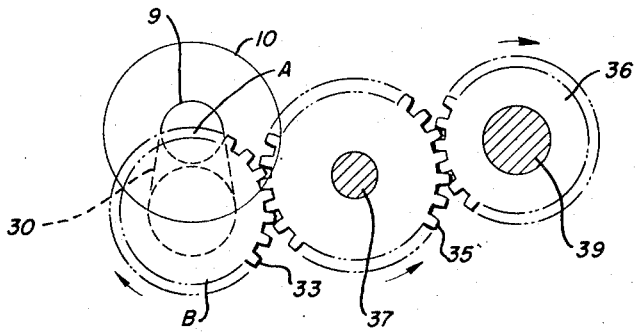
Fig. 10 is a view similar to Fig. 9, but illustrating the position of the parts after the drive shaft has rotated 270 degrees.

The movement will be better understood by reference to Figs. 7, 8, 9 and 10, wherein Fig. 7 shows the relationship of the shaft 9 and gears 33, 35 and 36 at the beginning of the rotary movement (which is the position of the parts shown in Figs. 5 and 6), Fig. 8 shows the relationship of these parts after shaft 9 has been rotated 90 degrees in a clockwise direction, Fig. 9 shows the relationship of the parts after shaft 9 has been rotated 180 degrees, Fig. 10 shows the relationship of the parts after shaft 9 has been rotated 270 degrees, and Fig. 7 shows the relationship of the parts after shaft 9 has been rotated 360 degrees (the parts being again in their original position).

In Fig. 7, the velocity of the gear 33 is zero, and from this point until the parts are in the position shown in Fig. 8, the velocity increases gradually, but relatively slowly. From the position shown in Fig. 8 to that shown in Fig. 9, the velocity increases more rapidly, reaching a maximum when the parts are in the position shown in Fig. 9. From the position shown in Fig. 9 to that shown in Fig. 10, the velocity changes in the same manner as from Fig. 8 to Fig. 9, but is a decelerated velocity. From the position shown in Fig. 10 to the return to the position shown in Fig. 7, the velocity decreases more rapidly, until the velocity is again zero when the parts are in the position shown in Fig. 7.

This may be explained by reference to Figs. 7 to 10. In Fig. 7, the point A on the pitch circle of the gear 33 is coincident with the axis of rotation of the shaft 9, and this relationship persists throughout the ensuing orbital movement of the gear 33 about the shaft. A second point B, on the gear 33, which is diametrically opposite point A, will also be considered.

It will be noted that the point A will have a peripheral speed of substantially zero during orbital movement of the gear 3, whereas point B, which is radially farthest removed from the axis of shaft 9, will have a greater peripheral velocity than any other point on the periphery of gear 33.

Any selected peripheral points or teeth on the gear 33, which are intermediate the points A and B, will have a peripheral velocity greater than that of A and less than that of B.

Therefore, when the gears are in the position shown in Fig. 7, the gear 33 imparts no movement to the gear train.

As the gear 33 rotates orbitally in the direction indicated by the arrow, it also has an effective axial rotation in relation to the gear 35, thereby resulting in successive interengagement of the teeth on gears 33 and 35 to cause axial rotation of the gear 35 in a counter-clockwise direction shown by the arrow. The gear 36 has an equivalent clockwise axial rotation, thus rotating shaft 60.

Each successive tooth on gear 33 between points A and B has a greater peripheral speed than its preceding teeth, so that the axial rotation of gear 35 is constantly accelerated as gear 33 rotates.

In Fig. 8 is shown the position of the gear train after gear 33 has been rotated orbitally and axially through 90 degrees of arc. The points A and B have been rotated 90 degrees from the position shown in Fig. 7, and the gear train, supported by the link 31, has pivoted clockwise about pin 39 and has also shifted linearly upwardly in response to movement of the crank arm 30. The radial distance, from the axial point A to the engaged tooth on gear 33 is slightly less than one-half the radial distance from point A to point B, so that the peripheral speed of this engaged tooth is slightly less than one-half the maximum peripheral speed of the gear 33, which occurs at point B.

As gear 33 continues its rotation to the position shown in Fig. 9, the peripheral velocity of its engaging teeth steadily increases and reaches its maximum when point B is engaged, after 180 degrees of rotation from the position shown in Fig. 7. The crank arm movement has shifted link 31 outwardly to its maximum displacement and has pivoted it counterclockwise to return it to its original position of angularity.

Further rotation of the gear 33 causes its teeth to engage successively from point B toward point A. Therefore the peripheral velocity of the engaging teeth steadily decreases from the maximum obtained in Fig. 9. As the gear 33 reaches 270 degrees of angular rotation, the position of the parts is as shown in Fig. 10, wherein the gear train has been pivoted in a counterclockwise direction and has been drawn linearly forwardly by the crank arm. In this position, the peripheral velocity of the engaged tooth on gear 33 is the same as it was in the position shown in Fig. 8.

Continued rotation of gear 33 is accompanied by rapidly diminishing speed of the successively engaged teeth until the parts return to their original position shown in Fig. 7, at which time minimum peripheral tooth velocity of zero is attained.

It will be readily understood that the gear 36 has been rotated 360 degrees in response to the above-described cycle of rotation of crank arm 31 and gear 33.

During the movement of the gears 33, 35 and 36, the axis of the pin 31 moves reciprocally in a linear path from point C to point D (Fig. 5), due to the fact that the slide plate 52 has reciprocal movement in the cover 5, being confined against lateral movement by the surfaces E and F (Fig. 4) in the cover 5, which act as slideways for the plate 52. The shaft 60 is made sufficiently long that the end of the shaft which is connected to the universal coupling 61 has no orbital or reciprocal movement, the universal coupling or joint 61 permitting the shaft 62 to rotate about its own axis only.

The link 31, during the rotation of the shaft 9, moves in a path which causes the arms 31a and 31b thereof to rock slightly with respect to the wear strips 43, and this rocking is permitted by the engagement of the arcuate ends 31c and 31d with the wear strips.

During the aforesaid movements, the cover plate 52 slides over the opening 53, but at no time uncovers this opening. In this manner, the plate 52 provides protection against the entry of dirt and foreign matter into the housing and mechanism.

In Figs. 2, 3, 5 and 6, means are shown, somewhat diagrammatically, for automatically retracting the index pin 70 at the beginning of the cycle of rotation of the shaft 9 and for automatically returning the index pin to locking position at the conclusion of this cycle. Such means comprises a pin 74 which projects from the end of the link 31, a pin 75 slidably mounted in the housing 1, and a switch 76.

Referring to Figs. 3 and 6, it will be noted that the air cylinder 27 is provided with two conduits 28 and 29, conduit 28 in Fig. 6 being a continuation of this conduit shown in Fig. 3. An air vent is shown at 77 (Fig. 3) and a pull rod at 78. Conduit 72 (Fig. 3) and conduit 29 (Fig. 6) are connected to a four-way electrically-operated air valve (not shown) normally deenergized, so as to admit compressed air through conduit 29 (Fig. 6) into the chamber at the left end of the piston 26, thereby keeping clutch member 22 disengaged and letting air escape through conduit 72 (Fig. 3) and through said air valve. This permits spring 71 (Fig. 3) to keep the index pin in the locking position shown.

In order to start an indexing cycle, an electric manually-operated pushbutton (not shown) will energize the aforesaid electric four-way valve, thereby reversing the compressed air flow. Air will now flow through conduit 72 (Fig. 3) into the upper chamber of the index pin cylinder, thereby disengaging index pin 70. When the index pin is safely disengaged, the upper surface of piston 73 will uncover the air port to which conduit 28 is attached and carry compressed air through conduit 28 into the chamber at the right of the piston 26 (Fig. 6) forcing piston 26 to the left, thereby engaging clutch teeth 12 and 23. Since the worm wheel 10 is in constant motion, the index cycle is started and continues until pin 74 again cams past pin 75 which, through switch 76, deenergizes the four-way valve, reversing the compressed air flow, disengaging the clutch teeth, and engaging the index pin. This completes the index cycle, during which gear 36 will have revolved one revolution, from zero to zero motion.

The aforesaid method of operation provides an interlock feature which at no time permits simultaneous engagement of the index pin and drive clutch which might cause breakage of parts.

The pull rod 78 is provided for the purpose of manually disengaging the index pin during job set-up or checking.

It is thus seen that I have provided a modification of the mechanism described in my aforesaid copending application, in which mechanism certain bevel gears, bearings and other working parts have been eliminated, thereby substantially reducing the cost of manufacture of the mechanism, without substantially altering the nature of the movement obtained.

It is to be understood that the form of my invention, herewith shown and described, is to be taken as a preferred example of the same, and that various changes in the shape, size, and arrangements of parts may be resorted to, without departing from the spirit of my invention, or the scope of the subjoined claims.

Having thus described my invention, I claim:

1. In a mechanism for rotating an index table between stations of the table, a rotatable drive shaft, a crank arm provided on said drive shaft for rotation therewith, a first gear fixedly secured to said crank arm, a link having one end thereof pivotally secured to said crank arm coaxially with said first gear, rectilinear guide means engaging the other end of said link to define a linear path of movement therefor, a second gear rotatably secured to said link in operative engagement with said first gear, a third gear rotatably secured to said link coaxially with said other end thereof in operative engagement with said second gear, whereby said third gear rotates at a varying velocity in response to uniform rotation of said drive shaft, and transmission means operatively connecting said third gear to the index table, said transmission means having universal movement relatively to said third gear.

2. A mechanism, as defined in claim 1, wherein said other end of said link is provided with lateral extensions, and said guide means comprise a pair of parallel tracks engaging said extension.

3. A mechanism, as defined in claim 1, wherein said transmission means comprises a connecting shaft, and a universal coupling securing said connecting shaft to said third gear for rotation therewith.

4. A mechanism, as defined in claim 1, including rotary power means, a clutch member adapted to connect said drive shaft to said rotary power means, means for locking said index table against rotation, means responsive to retraction of said locking means for actuating said clutch member, and means responsive to one revolution of said first gear for disconnecting said clutch member.

References Cited in the file of this patent

UNITED STATES PATENTS

| | | |
|---|---|---|
| 1,916,871 | Swift | July 4, 1933 |
| 1,920,877 | Bert 'Odatto | Aug. 1, 1933 |

FOREIGN PATENTS

| | | |
|---|---|---|
| 703,540 | France | May 1, 1931 |